(12) United States Patent
Ishida

(10) Patent No.: US 6,640,653 B1
(45) Date of Patent: Nov. 4, 2003

(54) LOAD DETECTION STRUCTURE FOR VEHICLE SEAT

(75) Inventor: Toshiaki Ishida, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/156,829

(22) Filed: May 30, 2002

(51) Int. Cl.$^7$ ............................................... G01L 1/22
(52) U.S. Cl. ........................... 73/862.627; 73/862.38
(58) Field of Search ........................ 73/862, 862.381, 73/862.627, 862.632; 177/144

(56) References Cited

U.S. PATENT DOCUMENTS

| | | | | |
|---|---|---|---|---|
| 6,040,532 A | * | 3/2000 | Munch | 177/144 |
| 6,087,598 A | * | 7/2000 | Munch | 177/144 |
| 6,092,838 A | * | 7/2000 | Walker | 280/735 |
| 6,161,891 A | | 12/2000 | Blakesley | |
| 6,242,701 B1 | * | 6/2001 | Breed et al. | 177/144 |
| 6,288,649 B1 | * | 9/2001 | Wolfe | 340/667 |
| 6,342,683 B1 | * | 1/2002 | Aoki et al. | 177/144 |
| 6,442,504 B1 | * | 8/2002 | Breed et al. | 702/173 |
| 6,448,512 B1 | * | 9/2002 | Cooper | 177/144 |
| 6,490,515 B1 | * | 12/2002 | Okamura et al. | 701/49 |

FOREIGN PATENT DOCUMENTS

| | | |
|---|---|---|
| JP | 11-1153 | 1/1999 |
| JP | 11-304579 | 11/1999 |

* cited by examiner

*Primary Examiner*—Edward Lefkowitz
*Assistant Examiner*—Andre Allen
(74) *Attorney, Agent, or Firm*—Browdy and Neimark, P.L.L.C.

(57) ABSTRACT

A load detection structure in a vehicle seat with a support leg member, which includes a rigid yet resilient block member having a pivotal end portion, a thin intermediate portion, and a securing portion in which pin (s) is/are provided, and a strain gauge attached to the thin intermediate portion of block member. The support leg member has at least one first hole formed in the bottom wall thereof and two second holes formed in the respective two vertical walls thereof. The block member is arranged between the seat and support leg member, such that the securing portion thereof of is fixed via one end of the pin (s) to the seat, with another end of the pin (s) extending through the at least one first hole, while the pivotal end portion of block member is rotatably connected with the support leg member by fitting two flanged collars in the two second holes, respectively, and then inserting a pivot pin through those two flanged collars and second holes.

5 Claims, 3 Drawing Sheets

LOAD DETECTION STRUCTURE FOR VEHICLE SEAT

BACKGROUND OF INVENTION

1. Field of the Invention

The present invention relates to a structure allowing for detection of a load applied to a vehicle seat. In particular, the invention is directed to such load detection structure for use in a vehicle seat.

2. Description of Prior Art

Recent years have witnessed a tendency for various automatically controlled functions and mechanisms to be increasingly incorporated in vehicle or automobiles, including safety devices such as air bags for protecting passengers against a great impact automatically in response to a collision, as well as various kinds of seat position adjustment devices for automatically adjusting the positions of seat sensitive to driver's or passenger's physiques and seating conditions. With such automated control innovations, there have been also found technical improvements to a passenger detection system for detecting the presence and absence of a passenger or driver in a seat of vehicle in advance before actuating or stopping the associated mechanical elements to automatically control various functions and mechanisms built in the seat.

Normally, the passenger detection system employs various sensors (e.g. a pressure sensitive element) which detect the weight of a passenger on a seat and emit a signal to electronic control systems for automatic control of various mechanical elements related to the seat. Most of the sensors are of a simple structure which can only sense the presence and absence of passenger on a seat, but the recent high-tech control technology inevitably requires that the sensors should further detect whether the passenger is an adult or a child as with an air bag control system for instance.

To meet the demand, there have been proposed sensor systems for numerically detecting the weight of passenger or a corresponding load applied to the seat, determining whether the passenger is adult or child, according to a numerical data obtained, and then controlling and adjusting the associated mechanical elements to optimal conditions suited for the adult or child (e.g. controlling air bag), as disclosed from the Japanese Laid-Open Patent Publications Nos. 11-001153 and 11-304579. Namely, the Japanese Laid-Open Patent Publication No. 11-001153 shows a combination of an impact sensor and four load sensors, wherein each of the four load sensors is interposed between a slide rail device on which the seat is mounted and a support leg member fixed on the floor of vehicle. It also suggests an H-shaped base plate on which wiring of the load sensors is collectively arranged for electrical connection with another one cable. According thereto, the weight of an occupant on the seat is detected by the four load sensors in a collision case, and a signal emitted therefrom is determined by a control unit as to the numerical amount of the occupant's weight, so that the air bag is adjusted in inflation according to the numerical data on the occupant's weight, thereby realizing a proper inflation of air back to protect the occupant if optimally according to his or her physique. On the other hand, the Japanese Laid-Open Patent Publication. No. 11-304579 discloses plural link mechanisms each having an arm pivoted therein, the link mechanisms being arranged between a slide rail fixed to a seat and a support base fixed on the floor of vehicle. In this prior art, a load sensor is provided at the free end portion of each arm of the link mechanism, such that a load applied vertically to the seat is imparted through the pivoted arm as an amplified or reduced vertical motion to the load sensor which then detects the amount of such vertical motion and determine a total weight of the seat and occupant on the seat. This reference states that a signal corresponding to the total weight may be emitted from the load sensors to a control unit associated with air bag and seat adjustment device, for instance.

However, the Japanese Laid-Open Patent Publication No. 11-001153 has no description regarding the mechanical structure of load sensor itself, and has no specific teaching on how the load sensor structurally supports the seat and how it actions to detect the seat occupant's weight. This prior art is therefore neither realistic nor practical in assembling an optimal mechanical structure between the sensor and seat. The Japanese Laid-Open Patent Publication No. 11-304579 is found defective in that its link mechanism and pivoted arm are complicated in structure and further they occupy much of space heightwise between the seat and slide rail device, which results in the seat becoming large vertically in size and increasing its weight. Consequently, there remains a room of improvement in materializing a simplified and effective structure for this sort of load detection system. Also, no particular design has been contemplated to make assembling the load detection system easy and to render the structure of load detection system adaptable for mounting on the shape and condition of floor of vehicle.

SUMMARY OF THE INVENTION

In view of the above-stated drawbacks, it is therefore a primary purpose of the present invention to provide an improved load detection structure which is greatly simplified in structure with reduced number of constituent elements and effective in avoiding undesired increase in height of the seat.

In order to achieve such purpose, according to the present invention, there is basically provided a load detection structure arranged under a bottom side of seat cushion of a vehicle seat and in a support leg means having a pair of mutually opposed vertical walls, the load detection structure including a load detection means for detecting a load applied from a seat occupant to the vehicle seat, wherein the load detection means comprises:

a block member having an elongated body extending in the longitudinal direction thereof, the block member having a rigid yet elastically deformable property and including, defined therein, a securing portion, a pivotal end portion, and a thin intermediate portion between the securing portion and pivotal end portion;

a strain gauge means fixedly attached to the thin intermediate portion of block member;

opening means defined in the support leg means;

two holes formed respectively in the pair of mutually opposed vertical walls of support leg means;

a pin means provided in the securing portion of block member; the pin means including a small-diameter portion and a large-diameter portion, wherein the small-diameter portion is secured in the securing portion of block member, and the large-diameter portion extends downwardly through the opening means, with a small clearance given peripherally thereof to space the large-diameter portion from the opening means, wherein the large-diameter portion has a flat head large in diameter than the opening means;

a pair of flanged collars; and the block member being interposed between the bottom side of the seat cushion and the support leg means in such a manner that the securing portion of block member is a securely connected with bottom side of seat cushion, while the pivotal end portion of block member is rotatably journalled via a pivot pin between the pair of mutually opposed vertical walls of support leg means by fitting the pair of flanged collars in the respective two holes and then inserting the pivot pin through those pair of flanged collars and two holes;

wherein, when a downward load is applied to the seat in a vertical direction, the securing portion of the block member is displaced in a generally rectilinear downward direction, while at the same time, the pivotal end portion of the block member is rotated about the pivot pin, whereupon a difference is caused in movement and direction between said securing portion and said pivotal end portion, thereby causing deflection of the thin intermediate portion, and, in response thereto, the strain gauge detects an amount of the deflection and emits a corresponding value indicative of an amount of the load.

Accordingly, there is eliminated the need to provide a great number of intricate parts and fittings for assembling the load detection structure in the seat as found in the prior art. It is therefore quite easy for a worker to assemble the seat with such load detection structure at highly reduced costs, and also, the worker can quickly secure the thus-assembled seat to the vehicle floor. The two flanged collars can easily be fitted in the respective two bearing holes and stably set therein temporarily, which makes it extremely easy for the worker to insert the pivot pin through both of the two holes and, thereby expediting the process for assembling a seat. For, this is indeed superior to the troublesome steps of interposing cylindrical spacers between the block member and support leg member while simultaneously inserting the pivot pin through all the bores and spacers. The flanged collars are also effective in preventing the block member against transversal dislocation with respect to the support leg means, thus contributing to a high sensitivity of the strain gauge to the vertically applied load or force.

In one aspect of the present invention, the pin means may comprise at least two pins, each being so formed to have the small-diameter and large-diameter portions, and the opening means may comprise a pair of spaced-apart holes formed in said bottom wall of the support leg means.

In another aspect of the present invention, the pin means may comprise one pin so formed to have the small-diameter and large-diameter portions, and the opening means may comprise one hole formed in the bottom wall of the support leg means.

Other various features and advantages of the invention will become apparent from reading of the descriptions hereinafter, with reference to the annexed drawings.

DETAILED DESCRIPTION OF PREFERRED EMBODIMENT OF THE PRESENT INVENTION

Figure 1:
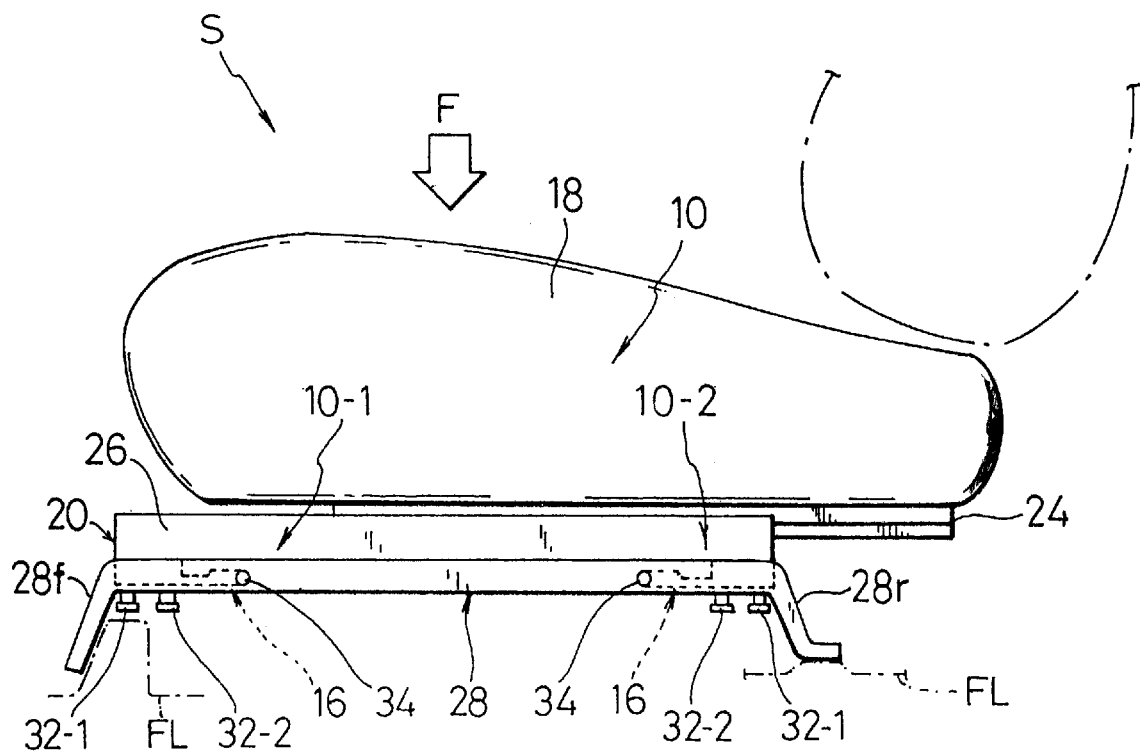
FIG. 1 is a side view showing a principal part of a load detection structure in accordance with the present invention, which is applied to a vehicle seat.

Referring to FIGS. 1 through 6, there is illustrated one preferred mode of load detection structure applicable to a vehicle seat in accordance with the present invention. Reference is first made to FIG. 1 in which designation (10) generally represents a load detection structure provided between a slide rail device (20) and a support leg member (28) in a novel simplified manner.

As is known, the slide rail device (20) comprises a stationary lower rail (26) to be fixed on a floor (FL) of a vehicle (not shown) and a movable upper rail (24) slidably fitted in and along the longitudinal slit (26h) of the lower rail (26). The typical configuration of such slide rail device (20) is shown in the figures, wherein the movable upper rail (24) has generally inverted-T-shaped base portion slidably accommodated within the lower rail (26) via steel balls and rollers (not shown). As seen from FIG. 1, the upper rail (24) is fixedly attached to a seat cushion (18) of a vehicle seat (S) whereas the lower rail (26) is securely and operatively attached via the load detection structure (10) upon the support leg member (28). Support leg member (28) has a forward vertical securing leg portion (28f) and a backward vertical securing leg portion (28r). As shown, those two securing leg portions (28f)(28r) are firmly fastened to a floor (FL) of vehicle.

Though not shown clearly, in fact, both slide rail device (20) and support leg member (28) are each provided in pair. Namely, a pair of slide rail devices (20) are provided under the bottom of seat cushion (18) and a pair of support leg members (28) are provided for supportively receiving those two slide rail devices (20) thereon, respectively. Of course, the load detection structure (10), a principal part of the present invention, is interposed between each slide rail device (20) and each support leg member (28), and therefore a pair of load detection structures (10) are arranged under the seat (S).

According to the embodiment shown in FIG. 1, the load detection structure (10) is divided into forward and rearward load detection structures (10-1)(10-2) which are respectively disposed in the forward and rearward regions of a mutually mated pair of lower rail (26) and support leg member (28). Therefore, as far as the present embodiment is concerned, while not shown, it follows that a pair of forward load detection structures (10-1) are so arranged forwardly of the seat (S) that they are respectively disposed in the forward regions of left-side mated pair of lower rail (26) and support leg member (28) and in the forward regions of right-side mated pair of lower rail (26) and support leg member (28), whereas a pair of rearward load detection structures (10-2) are so arranged rearwardly of the seat (S) that they are respectively disposed in the rearward regions of right-side mated pair of lower rail (26) and support leg member (28) and in the rearward regions of left-side mated pair of lower rail (26) and support leg member (28). Since all the load detection structures (10-1)(10-2), the pair of slide rail devices (20) and the pair of support leg members (28) are identical in structure to one another, description will be made only of one forward load detection structure (10-1) in one of the two slide rail devices (20) and one of the two support leg members (28), for the sake of simplicity.

In accordance with the present invention, the load detection structure (10) includes a load detection element (16)

workable to detect an amount of a load (F) applied vertically from an occupant on the seat (S).

Figure 2:
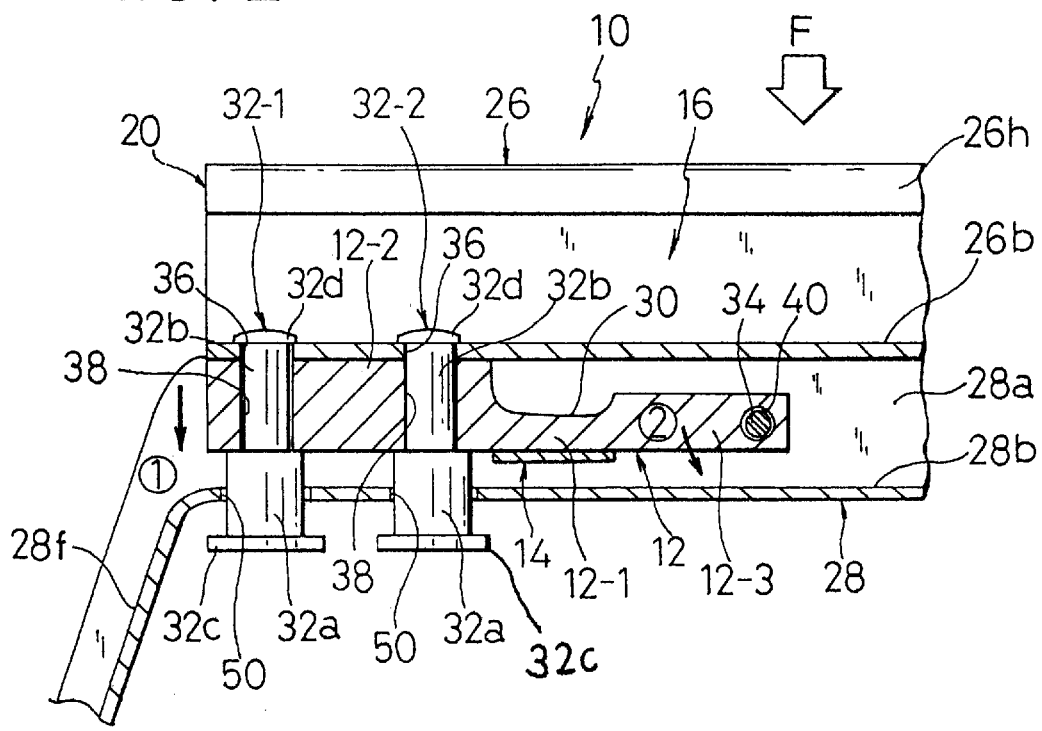
FIG. 2 is a partly broken sectional view showing a basic generic structure of a block member and other principal parts in the load detection structure, and explanatorily showing a deflection of the block member.
Figure 3:
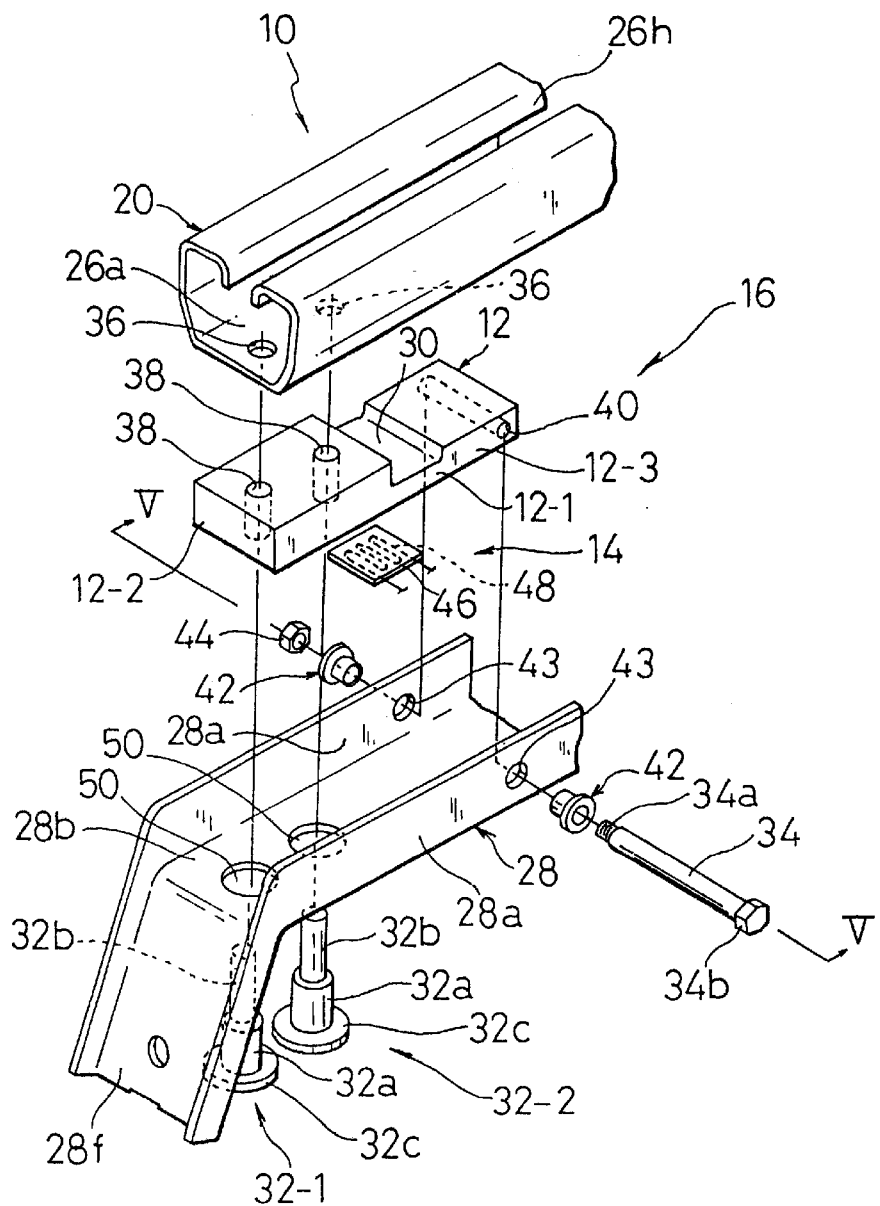
FIG. 3 is a partly broken, exploded schematic perspective view of the principal part of the load detection structure.

FIGS. 2 and 3 shows one embodiment of the load detection element (16). Namely, the load detection element (16) comprises: a block member (12) having a pivotal end portion (12-3); a vertically movable securing base portion (12-2); a thin intermediate portion (12-1); and a strain gauge (14) for detecting a deflection of the block member (12) which is caused by a difference in movement and direction between the pivotal rotation of the pivotally rotatable end portion (12-3) and the vertical displacement of the rectilinearly movable securing base portion (12-2).

According to the illustrated embodiment, in brief, the block member (12) is rotatably connected with the support leg member (28) at a given pivot point in the pivotal end portion (12-3) thereof (at 40 or 34 as will be described), while being connected at the securing base portion (12-2) thereof between the slide rail device (20) and support leg member (28), so that the thin intermediate portion (12-1) is deflectable in the vertical direction relative to that pivot point due to the afore-stated reasons.

As shown, the strain gauge (14) is attached tight (via an adhesive for example) on the bottom side of the block member thin intermediate portion (12-1) for detecting an amount of strain or deflection mentioned above, which is caused in the block member (12). The strain gauge (14) is of a known type comprising an electrical insulating thin plate (46) and a metallic resistance wire (48) embedded sinuously in that thin plate (46). Of course, the thin plate (46) is of an elastic property and may be resiliently deformable. The strain gauge (14) is not imitative, but may be formed in any otherwise manner without using such resistance wire (48) insofar as it can detect the deflection of block member (12).

The block member (12) is generally of a longitudinally extending plate-like configuration which elongates its body lengthwise, thus having a body of large longitudinal length with a small width relative thereto, as seen from FIGS. 2 and 3. Also, it is formed from a rigid yet resiliently deformable material having a property that tends to recover into its original shape even when subjected to deformation by a great external load applied thereto. For that purpose, preferably, the block member (12) may be formed from a spring steel material. As best shown in FIGS. 2 and 3, the block member (12) is so formed to have, defined therein, a pivotal end portion (12-3), a securing base portion (12-2) which is relatively larger in heightwise thickness than the pivot end portion (12-3), and a thin intermediate portion (12-1) which is formed relatively thin heightwise between those two portions (12-2)(12-3). It is thus observed from FIG. 2 that the upper surface of the pivotal end portion (12-3) is lower than the upper surface of the securing base end portion (12-2), which allows the pivotal end portion (12-3) per se to rotate about the pivot point (at 40). The thin intermediate portion (12-1) is defined by forming a cutout region (30) in the corresponding upper half of intermediate area of block member (12) such that the cutout region (30) penetrates or extends transversely thereof. As will become apparent later, the thin intermediate portion (12-1) is a point providing a vertical resilient bendability of the block member (12) relative to the pivot point (at 40 or 34) of the end portion (12-3).

It is noted that the strain gauge (14) may be fixedly attached on the cutout region (30) of thin intermediate portion (12-1) by means of adhesive or the like.

As illustrated in FIGS. 2 and 3, the block member (12) is further formed with a pair of vertically extending securing through-bores (38)(38) which penetrate vertically in and through the securing portion (12-2) thereof. A pair of securing holes (36)(36) are formed in the bottom wall (26b) of lower rail (26), whereas a pair of holes (50)(50) are formed in the base area (28b) of support leg member (28). The block member (12) is also formed with a horizontally extending bearing through-bore (40) in the pivotal end portion (12-3) thereof.

On the other hand, perforated in the bottom wall (26b) of lower rail (26) are the two securing holes (36)(36) in a concentric alignment with the respective two securing through-bores (38)(38) of block member (12). Also, perforated in the base area (28b) of support leg member (28) are the two holes (50)(50) in a concentric alignment with the respective two securing through-bores (38)(38).

Designations (32-1)(32-2) denote first securing pin and second securing pin, respectively. Each of the securing pins (32-1)(32-2) is a rivet-type pin whose one end can be riveted, and is commonly so formed to have a circular flat head (32c), a large-diameter shank portion (32a) and a small-diameter shank portion (32b) defined integrally together, wherein the free end of the small-diameter shank portion (32b) can be riveted.

It is noted that both diameters of the securing through-bores (38) and securing holes (36) are generally equal to or slightly larger than the external diameter of the small-diameter shank portion (32b) of securing pin (32), and that the diameter of each hole (50) is larger than the external diameter of the larger-diameter shank portion (32a) of securing pin (32), but smaller than the external diameter of the flat head (32c) of the same pin (32).

A pivot pin (34) is shown as having a radially extending head (34b) and a threaded end portion (34a).

Designations (43)(43) denote a pair of bearing holes formed in a pair of vertical walls (28a)(28a) of support leg member (28) in a mutually opposed relation. As will be described, the pin (34) is to pass through the two bearing holes (43)(43).

Figure 4:
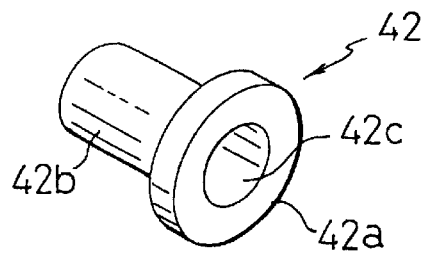
FIG. 4 is a schematic perspective view of a flanged collar used in the load detection structure.
Figure 5:
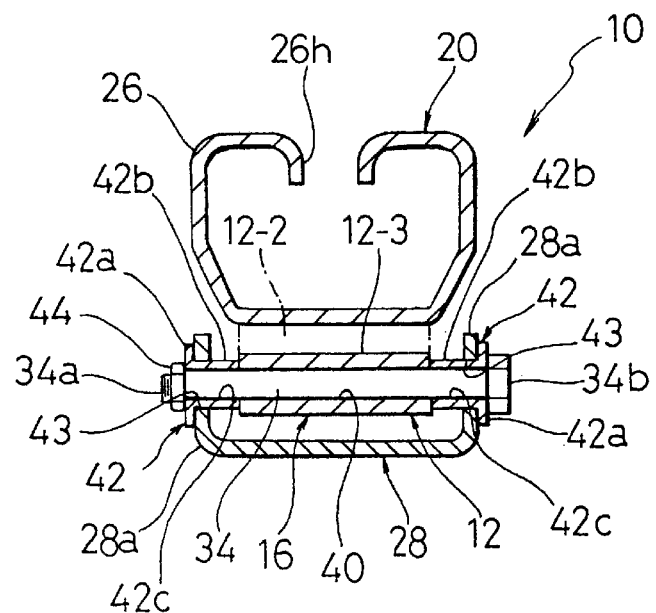
FIG. 5 is a sectional view taken along the line V—V in the FIG. 3.

In accordance with the present invention, there are provided a pair of flanged collars (42)(42). As best shown in FIG. 4, each of the two flanged collars (42) is formed by a cylindrical collar body (42b), an integral flange (42a) formed radially in one end of the cylindrical collar body (42b), and a through-hole (42c).

In assembly, as understandable from FIGS. 3 and 4, at first, the pivot pin (34) is inserted through one flanged collar (42) and one bearing hole (43) of support leg member (28), passing through the bearing through-bore (40) of block member (12), so that the threaded end portion (34a) of pivot pin (34) projects through another flanged collar (42) and another bearing hole (43) of the same support leg member (28). Then, a securing nut (44) is threadedly engaged about the threaded end portion (34a) of pivot pin (34), whereupon the pivotal end portion (12-3) of block member (12) is rotatably coupled via the pivot pin (34) with the support leg member (28). It is appreciated that the flanged collar (42) can easily be fitted in the corresponding bearing hole (43) from a side outwardly of the vertical walls (28a)(28a) of leg support member (28) and set in the hole (43) in a stable way, which allows easy insertion of the pivot pin (34) therethrough. Further, it is seen from FIG. 5 that both two flanged collars (42) are at their respective cylindrical bodies (42b) contacted with both lateral sides of the block member pivotal end portion (12-3), thereby preventing the block member (12) per se against transversal movement with respect to the support leg member (28).

Then, the two securing pins (32) are respectively passed through the two holes (50), the two through-bores (38) and the two holes (36) until the shoulders of the large-diameter portions (32a) of two securing pins (32) are abutted against the bottom surface of block member (12). Finally, both ends of small-diameter shank portion (32b) of securing pins (32) are riveted, as at (32d) in FIG. 2, to thereby firmly fasten the base securing portion (12-2) of block member (12) to the bottom wall (26b) of lower rail (26). In this regard, it is observed from FIG. 2 that each large-diameter shank portion (32a) of securing pin (32) extends downwardly through the corresponding hole (50), with a small clearance given peripherally thereof, to thereby space the large-diameter shank portion (32a) from the surrounding circular edge of the hole (50), and that each large-diameter shank portion (32a) terminates in the circular flat head (32c) which is situated at a predetermined level below the base area (28b) of support leg member (28).

It is noted here that, instead of the two securing pins (32), two integral projections equivalent to the pins (32) may be formed integrally in the block member base securing portion (12-2). Namely, while not shown, two columnar projections each with a circular flat head, which are each equivalent in size and function to the larger-diameter shank portion (32a) and circular flat head (32c) of securing pin (32), may be integrally formed on the bottom surface of the block member securing portion (12-2). Also, another two columnar projections, each being equivalent in size to the end portion of the small-diameter shank portion (32b) of securing pin (32), may be integrally formed on the upper surface of the block member base securing portion (12-2).

With the above-described construction of the load detection means (10), it can be seen from FIGS. 1 and 2 that, when a vertical load or a weight of occupant on the seat (S), as designated by (F), is applied to the slide rail device (20), the corresponding downward force is directly imparted to the securing base portion (12-2) of block member (12), thus causing downward displacement of that particular securing base portion (12-2) as indicated by the arrow ①, and, concurrent therewith, the pivotal end portion (12-3) of the same block member (12) is caused by such downward displacement to rotate downwardly as indicated by the arrow ② relative to the pivot pin (34). As a result thereof, a deflection is caused in the thin intermediate portion (12-1) of block member (12), in response to which, the strain gauge (14) immediately detects an amount of such deflection, determines it as a weight of the occupant on the seat (S), and emits a corresponding electric signal to a control unit (not shown).

Figure 6:
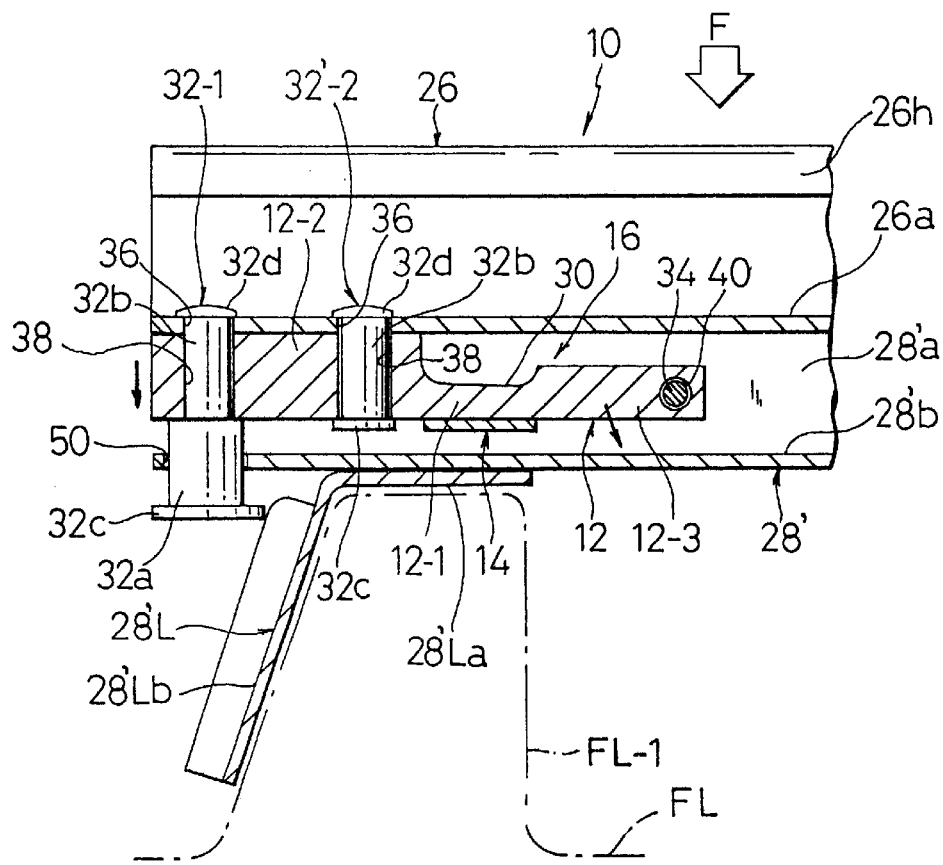
FIG. 6 is a partly broken sectional view showing another alternative embodiment of the load detection structure.

FIG. 6 illustrates another alternative embodiment of the load detection structure (10) which may be applied to another different type of support leg member (28'). In this embodiment, in contrast to the above-described first mode of support leg member (28) having vertical securing leg portion (28f or 28r) defined integrally at the extremity thereof, the present illustrative mode of support leg member (28') has a separate securing leg portion (28'L) fixed to the bottom wall (28') thereof at a point adjacent to the first securing pin (32-1). Namely, in the case where the floor (FL) has an upwardly protrudent floor portion (FL-1) disposed at a point corresponding to the afore-said second securing pin (32-2), it is required to use such different type of support leg member (28'). In that case, the securing leg portion (28'L) is fixed at its horizontal upper region (28'La) to the bottom wall (28'b) of support leg member (28') at that point, with the substantially vertical lower region (28'Lb) thereof extending downwardly from the horizontal upper region (28'La).

Though not shown, the vertical lower region (28'Lb) is firmly fastened by a securing screw to the floor portion (FL-1). According to the present mode, the load detection means (16) may be modified only in terms of the second securing pin (32-2) to allow its use on a particular condition requiring the irregular or protrudent floor portion (FL-1). Specifically stated, the basic structure and elements used in this FIG. 6 embodiment are identical to those described in the foregoing first embodiment shown in FIGS. 2 to 4, only except that a short second securing pin (32'-2) is used in place of the relatively long second securing pin (32-2) and that only one hole (50) is formed in the bottom wall (28') of support leg member (28'). Therefore, no further explanation will be made as to all the common parts and elements between the present and foregoing first embodiments, and all like designations to be used herein corresponds to all like designations given above.

The second securing pin (32'-2) has a shank body (32b) equal in length and diameter to the short-diameter shank portion (32b) of the fist securing pin (32-1), and a flat head (32c). As shown in FIG. 6, the shank body (32b) of this pin (32'-2) is inserted in the through-bore (38) of the block member (12) and the hole (36) of the lower rail (26), and the free end of the shank body (32b) is revetted upon the bottom wall (26a) of lower rail (26) as indicated by (32d). This mode advantageously simplifies the load detection structure (10).

With the above-described construction of the load detection means (10), it can be seen from FIGS. 1 and 6 that, when a vertical load or a weight of occupant on the seat (S), as designated by (F), is applied to the slide rail device (20), the corresponding downward force is directly imparted to the securing base portion (12-2) of block member (12). Then, as likewise in the first mode of FIG. 2 and as indicated by the arrows in FIG. 6, such securing base portion (12-2) is displaced downwardly, which in turn causes the pivotal end portion (12-3) of the same block member (12) to rotate downwardly relative to the pivot pin (34). As a result thereof, a deflection is caused in the thin intermediate portion (12-1) of block member (12), in response to which, the strain gauge (14) immediately detects an amount of such deflection, determines it as a weight of the occupant on the seat (S), and emits a corresponding electric signal to a control unit (not shown).

Form the descriptions made thus far, it is appreciated that the present invention has the following effects and advantages:

(i) Basically, the load detection structure (10) is interposed between the slide rail device (20) and the support leg member (28) in a simplified pivoted manner. Namely, the longitudinally extending body of block member (12) with the strain gauge (14) attached thereto is pivotally connected with the support leg member (28) and secured to the lower rail (26) via a pair of securing pins (32-1)(32-2) or one securing pin (32-2), such that, when a load (F1) is applied to the block member (12), the block member base securing portion (12-2) is subjected to a generally rectilinear movement, whereas by contrast, the block member end portion (12-3) subjected to a rotational movement. Thus, such difference in movement and direction results in a downward deflection of the block member thin intermediate portion (12-1), in response to which, the strain gauge (14) detects a degree of the deflection and emits an electric signal indicative of a weight of a seat occupant corresponding thereto. With such simplified arrangement, the block member (12) is subjected to vertical deflection only within the height-wise range between the support leg member (28) and lower rail (26). Thus, it is appreciated that such heightwise thin construction does not lead to increase in height of the seat (S) and it is possible to keep the seat (S) situated at as low level as possible with reference to the floor. Furthermore, there is eliminated the need to provide a great number of intricate parts and fittings for assembling the load detection structure (10) in the seat as found in the prior art. It is therefore quite easy for a worker to assemble the seat with such load detection structure (10) at highly reduced costs, and also, the worker can quickly secure the thus-assembled seat to the vehicle floor (F).

(ii) The two flanged collars (42) can easily be fitted in the respective two bearing holes (43) and stably set therein temporarily, which makes it extremely easy for the worker to insert the pivot pin (34) through both of the two bearing holes (43) and bearing bore (40), thereby expediting the process for assembling a seat. For, this is indeed superior to the troublesome steps of interposing cylindrical spacers between the block member (12) and the support leg member (28) while simultaneously inserting the pivot pin (34) through all the bores and spacers. The flanged collars (42) are also effective in preventing the block member (12) against transversal dislocation with respect to the support leg member (28), thus contributing to a high sensitivity of the strain gauge (14) to the vertically applied load or force (F).

(iii) Generally stated, it can be seen that the block member (12) has two downward projections, like the two large-diameter shank portions (32a), which are each dependent therefrom, passing through the respective two holes (50), such that a space is given between each of the two downward projections and each of the two holes (50), and that each of the two projections terminates in a circular flat head, like the head (32c), which is larger in diameter than each hole (50). Accordingly, when a great upward force is applied to the block member (12) through the slide rail device (20), attempting to separate the lower rail (26) from the support leg member (28), both circular flat heads (e.g. at 32c) of two projections (e.g. at 32a) are quickly brought upwardly to contact with the peripheral edge regions of two holes (50), which effectively prevents separation of the lower rail (26) from the support leg member (28).

Finally, it should be understood that the present invention is not limited to the illustrated embodiment, but any other modifications, replacements and additions may be structurally applied thereto without departing from the scopes of the appended claims. For example, the load detection structure (10) may be interposed between the seat (S) and the support leg member (28), without using the slide rail device (20), by directly fastening the block member securing portion (12-2) to the bottom of seat (S). Further, the present invention may also be applied to any other protection device than air bag and seat adjustment devices, as well as to various kinds of seats usable in a train, aircraft or vessel.

What is claimed is:

1. A load detection structure provided under a bottom side of a seat cushion of a vehicle seat and in at least one support leg member having a pair of mutually opposed vertical walls, said load detection structure including a load detection means for detecting a load applied from an occupant on the vehicle seat, wherein said load detection means comprises:

a block member having an elongated body extending in the longitudinal direction thereof, said block member having a rigid yet elastically deformable property and including, defined therein, a securing portion, a pivotal end portion, and a thin intermediate portion between said securing portion and said pivotal end portion, a strain gauge element fixedly attached to said thin intermediate portion of said block member;

at least one opening defined in said at least one support leg member;

two holes formed respectively in said pair of mutually opposed vertical walls of said at least one support leg member;

at least one pin element provided in said securing portion of the block member; said at least one pin element including a small-diameter portion and a large-diameter portion, wherein said small-diameter portion is secured in said securing portion of the block member, and said large-diameter portion extends downwardly through said at least one opening, with a small clearance given peripherally thereof to space the large-diameter portion from the at least one opening, said large-diameter portion having a flat head large in diameter than said at least one opening, said flat head being disposed outwardly of the at least one opening;

a pair of flanged collars; and said block member being interposed between said bottom side of said seat cushion and said at least one support leg member in such a manner that said securing portion of the block member is securely connected with said bottom side of the seat cushion, while said pivotal end portion of the block member is rotatably journalled by a pivot pin between said pair of mutually opposed vertical walls of said at least one support leg member by fitting said pair of flanged collars in the respective said two holes and then inserting said pivot pin through said pair of flanged collars and said two holes;

wherein, when a downward load is applied to the vehicle seat in a vertical direction, said securing portion of the block member is displaced in a generally rectilinear downward direction, while at the same time, said pivotal end portion of the block member is rotated about said pivot pin, whereupon a difference is caused in movement and direction between said securing portion and said pivotal end portion, thereby causing deflection of said thin intermediate portion, and, in response thereto, said strain gauge element detects an amount of said deflection and emits a corresponding value indicative of an amount of said load.

2. The load detection as defined in claim 1, wherein said at least one pin element comprises at least two pins, each being so formed to have said small-diameter and large-diameter portions, wherein said at least one support leg member further includes a bottom wall defined between said pair of mutually opposed vertical walls, and wherein said at least one opening comprises a pair of spaced-apart holes formed in said bottom wall of the at least one support leg member.

3. The load detection structure as defined in claim 1, wherein said at least one pin element comprises one pin so formed to have said small-diameter and large-diameter portions, wherein said at least one support leg member further includes a bottom wall defined between said pair of mutually opposed vertical walls, and wherein said at least one opening comprises one hole formed in said bottom wall of the support leg member.

4. A load detection structure provided under a bottom side of a seat cushion of a vehicle seat and in at least one support leg member, wherein said at least one support leg member has a pair of mutually opposed vertical walls, a bottom wall defined between said pair of mutually opposed vertical walls, and at least one downwardly-extending securing leg portion integrally formed in at least one end thereof, said support leg member being adapted to be firmly secured to a floor, wherein said load detection structure includes a load detection means for detecting a load applied from an occupant on the vehicle seat, and wherein said load detection means comprises:

at least one block member having an elongated body extending in the longitudinal direction thereof, said at least one block member having a rigid yet elastically deformable property and including, defined therein, a securing portion, a pivotal end portion, and a thin intermediate portion between said securing portion and said pivotal end portion;

a strain gauge element fixedly attached to said thin intermediate portion of said at least one block member;

at least two first holes formed in said bottom wall of said at least one support leg member in vicinity of said at least one downwardly-extending securing leg portion;

at least two second holes formed respectively in said pair of mutually opposed vertical walls of said support leg member;

at least two pins provided in said securing portion of the at least one block member, said at least two pins each including a small-diameter portion and a large-diameter portion, wherein said large-diameter portion extends downwardly through one of said at least two first holes, with a small clearance given peripherally thereof to space the large-diameter portion from said each of the at least two first holes, said large-diameter portion having a flat head large in diameter than said each of the at least two first holes;

at least one pair of flanged collars; and said block member being interposed between said bottom side of the seat cushion and said at least one support leg member in such a manner that said securing portion of the at least one block member is securely connected, by said small-diameter portions of said at least two pins, with said bottom side of the seat cushion, with said large-diameter portions of said at least two pins extending through said at least first holes, respectively, while said pivotal end portion of the at least one block member is rotatably journalled by a pivot pin between said pair of mutually opposed vertical walls of said at least one support leg member by fitting said at least one pair of flanged collars in the respective said at least two second holes and then inserting said pivot pin through said at least one pair of flanged collars and said at least two second holes;

wherein, when a downward load is applied to the seat in a vertical direction, said securing portion of the at least one block member is displaced in a generally rectilinear downward direction, while at the same time, said pivotal end portion of the at least one block member is rotated about said pivot pin, whereupon a difference is caused in movement and direction between said securing portion and said pivotal end portion, thereby causing deflection of said thin intermediate portion, and, in response thereto, said strain gauge element detects an amount of said deflection and emits a corresponding value indicative of an amount of said load.

5. A load detection structure provided under a bottom side of a seat cushion of a vehicle seat and in at least one support leg member, wherein the at least one support leg member has: a pair of mutually opposed vertical walls; a bottom wall defined between said pair of mutually opposed vertical walls; at least one end; and at least one downwardly-extending securing leg portion fixed to said bottom wall in vicinity of said at least one end, said support leg member being adapted to be firmly secured to a floor at the at least one downwardly-extending securing leg portion thereof, wherein said load detection structure includes a load detection means for detecting a load applied from an occupant on the vehicle seat, and wherein said load detection means comprises:

at least one block member having an elongated body extending in the longitudinal direction thereof, said at least one block member having a rigid yet elastically deformable property and including, defined therein, a securing portion, a pivotal end portion and a thin intermediate portion between said securing portion and said pivotal end portion, a strain gauge element fixedly attached to said thin intermediate portion of said at least one block member;

one first hole formed in said bottom wall of said support leg member at a point distant from said at least one downwardly-extending securing leg portion;

at least two second holes formed respectively in said pair of mutually opposed vertical walls of said support leg member;

at least two pins provided in said securing portion of the at least one block member, wherein one of said at least two pins comprises a small-diameter portion and a large-diameter portion, wherein said large-diameter portion extends through of said one first hole, with a small clearance given peripherally thereof to space the large-diameter portion from said one first hole, said large-diameter portion having a flat head large in diameter than said one first hole;

at least one pair of flanged collars; and said block member being interposed between said bottom side of the seat cushion and said support leg member in such a manner that said securing portion of the at least one block member is securely connected, by said small-diameter portions of said at least two pins, with said bottom side of the seat cushion, with said large-diameter portions of said at least two pins extending through the respective said at least second wholes, while said pivotal end portion of the at least one block member is rotatably journalled by a pivot pin between said pair of mutually opposed vertical walls of said at least one support leg member by fitting said at least one pair of flanged collars in the respective said at least two second holes and then inserting said pivot pin through said at least one pair of flanged collars and said at least two second holes;

wherein, when a downward load is applied to the seat in a vertical direction, said securing portion of the at least one block member is displaced in a generally rectilinear downward direction, while at the same time, said pivotal end portion of the at least one block member is rotated about said pivot pin, whereupon a difference is caused in movement and direction between said securing portion and said pivotal end portion, thereby causing deflection of said thin intermediate portion, and, in response thereto, said strain gauge element detects an amount of said deflection and emits a corresponding value indicative of an amount of said load.

* * * * *